United States Patent [19]

Dougherty

[11] Patent Number: 5,609,405
[45] Date of Patent: Mar. 11, 1997

[54] OVERHEAD PROJECTOR FLUID DYNAMICS SIMULATOR

[76] Inventor: Dennis J. Dougherty, 1931 Riverside Dr., Sault Ste. Marie, Mich. 49783

[21] Appl. No.: 520,207

[22] Filed: Aug. 21, 1995

[51] Int. Cl.⁶ .................................................. G03B 21/14
[52] U.S. Cl. ........................................... 353/122; 434/126
[58] Field of Search .............................. 353/1, 2, 46, 50; 359/616, 617; 434/299, 302, 126

[56] References Cited

U.S. PATENT DOCUMENTS

| | | | |
|---|---|---|---|
| 3,541,705 | 11/1970 | Nelson | 434/126 |
| 3,837,094 | 9/1974 | Mazurek | 434/126 |
| 3,843,244 | 10/1974 | Facchini | 353/2 |

FOREIGN PATENT DOCUMENTS

| | | | |
|---|---|---|---|
| 1437900 | 11/1988 | U.S.S.R. | 434/126 |

*Primary Examiner*—William Dowling
*Attorney, Agent, or Firm*—Weiner, Carrier & Burt, P.C.; William F. Esser; Irving M. Weiner

[57] ABSTRACT

A portable water containing tray that uses various mediums to demonstrate and/or experiment with liquid and gas flow dynamics. It is designed to be compatible with overhead projection and contains a transparent activity area, fluid transport system, and activity components that when placed on an overhead projector allows light transmission through various liquid and/or solid object components. Fluids are recycled on the activity area by a pumping device. Various liquid dye and solid object components are placed on the activity area to simulate real-world events or environments. Solid activity components have a variety of internal and/or external flow configurations for creating a multitude of flow characteristics.

21 Claims, 2 Drawing Sheets

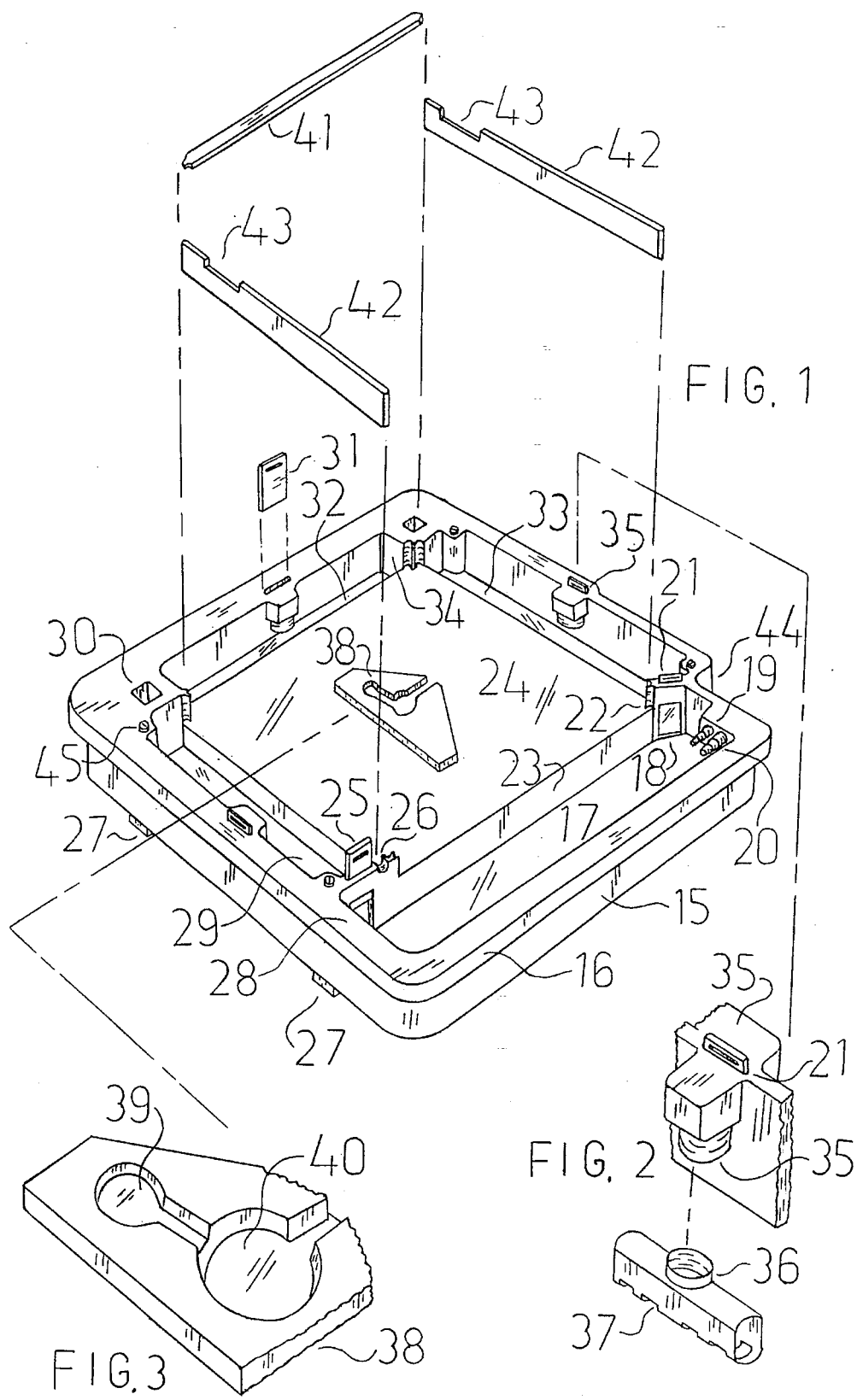

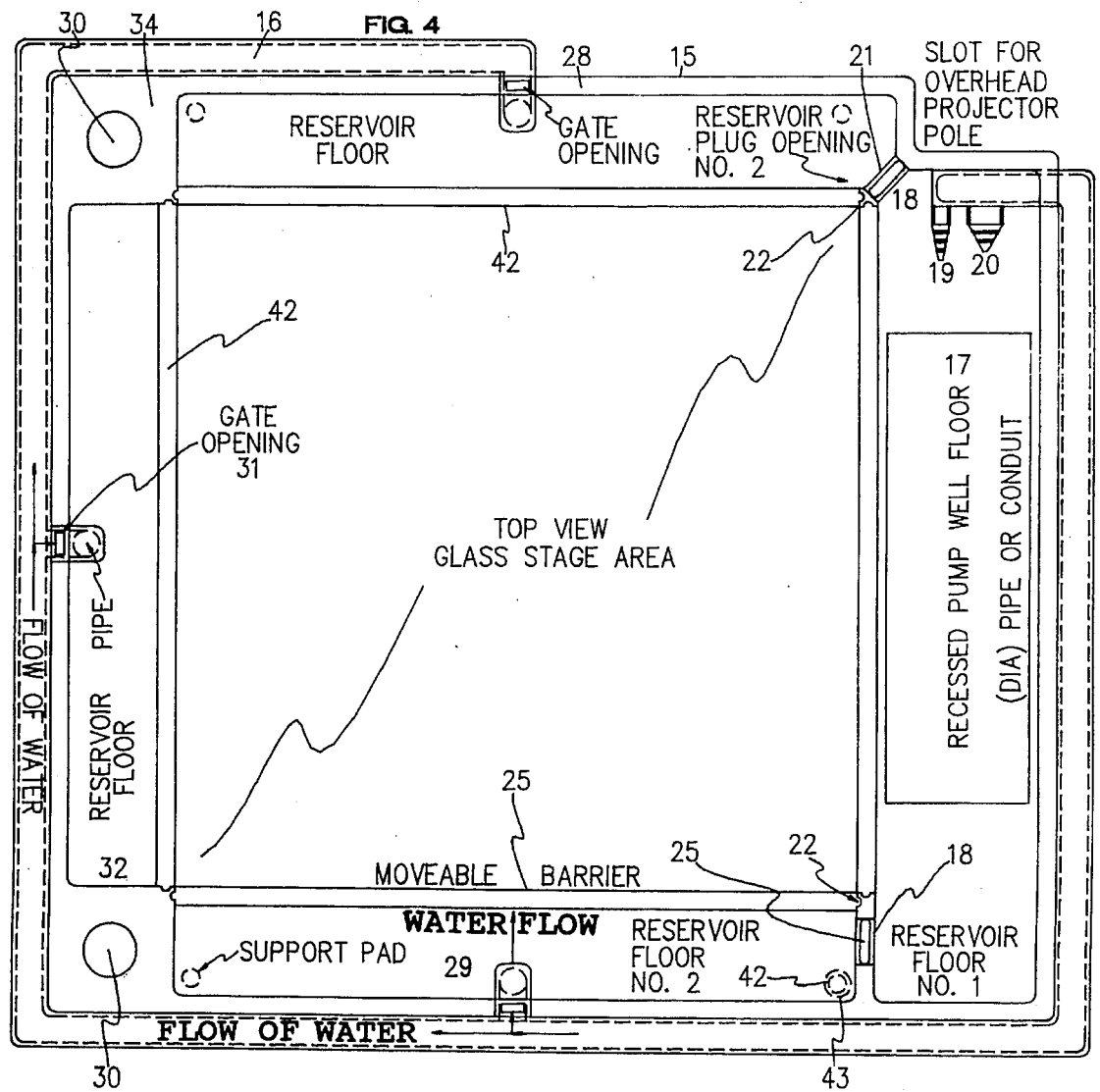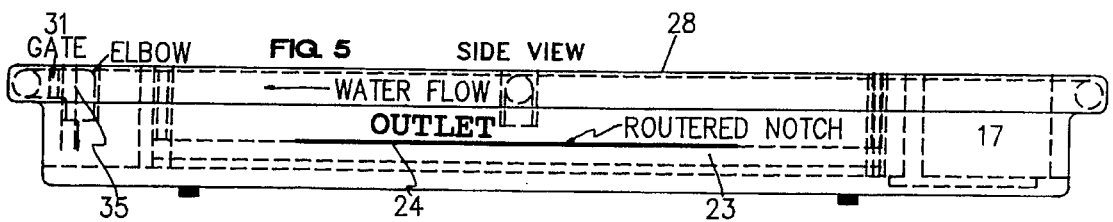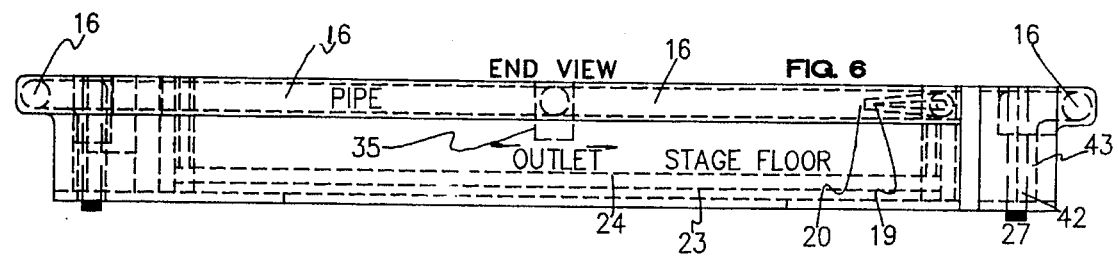

OVERHEAD PROJECTOR FLUID DYNAMICS SIMULATOR

BACKGROUND OF THE INVENTION

1. Field of the Invention

This invention relates to fluid dynamics demonstrations and experiments, specifically to a novel way to simulate real-world events in the science classroom.

2. Description of the Relevant Art

There are known devices called "ripple tanks" and "wave tanks" which comprise a stationary body of water and a means for generating a ripple or wave therein. These inventions, however, fail to disclose or otherwise suggest a device which cooperates with an overhead projector so that a controlled flow of fluid is used to emulate a number of different naturally occurring phenomenon for viewing by a substantially large audience.

SUMMARY OF THE INVENTION

The present invention overcomes the above-discussed shortcomings of known wave tanks and satisfies a significant need for an educational device which easily and accurately demonstrates fluid dynamics.

According to the present invention, there is disclosed a base member having a plurality of fluid reservoirs which are disposed along the periphery thereof; an activity area which is elevated relative to the fluid reservoirs; a means for selectively distributing fluid between the reservoirs; a means for selectively controlling a flow of fluid over the activity area from one fluid reservoir to another; and at least one plate member which is selectively placed on top of the activity area.

In use, the base member is placed on top of an overhead projector. Next, the fluid distributing means is set so as to direct fluid from a first fluid reservoir to another fluid reservoir. The fluid flow controlling means is then set to direct fluid flow over the activity area in the desired manner. The at least one plate member is placed on top of the activity area so that it is in the path of fluid flow. Thereafter, water is added to the fluid reservoir, thereby initiating fluid flow over the activity area.

The overhead fluid dynamics simulator invention is teacher and student friendly. It is easy to handle, clean, use, store. It promotes hands-on and minds-on lab activities at almost all education levels and subject areas that include life, earth, physical, and technical sciences. Fluid dynamic simulations incorporate common events involving: Bernoulli's principle and Newton's third Law of motion, movements of wind and water currents on shorelines, eddy currents, pollution, erosion, deposition, ground water movements in aquifers and artesian wells, high and low pressure cells, jet streams, tornadoes, convection currents, magma chambers, volcanic eruptions, how the sea affects weather a thousand miles away, ice storms affecting objects, bird and airplane wings and stall characteristics, fuselage bodies of fish and submarines, and diffusion. The present invention additionally simulates principles of magnetism and electricity forces, flow of plants, animals, cooling machines, pumps, and anything that experiences resistance with liquids.

BRIEF DESCRIPTION OF THE DRAWINGS

FIG. 1 is a perspective view of a preferred embodiment of the present invention.

FIG. 2 shows an expanded view of the fluid distribution system with conduit control gate and diffuser attachment.

FIG. 3 shows an activity plate of the present invention with upper and lower well structures.

FIG. 4 shows a top view of the preferred embodiment of the present invention.

FIG. 5 shows a side view thereof.

FIG. 6 shows an end view thereof.

REFERENCE NUMERALS IN DRAWINGS

| | | |
|---|---|---|
| 15. outer body wall | 16. transport conduit | 7. pump reservoir |
| 18. reservoir wall gate | 19. hose outlet | 20. pump inlet |
| 21. closed wall gate | 22. barrier groove | 23. stage wall |
| 24. activity area or stage | 25. opened wall gate | 26. hose holder |
| 27. leg or pad | 28. body rim | 29. reservoir |
| 30. food coloring dye well | 31. conduit gate door | 32. reservoir |
| 33. reservoir | 34. well wall | 35. conduit gate |
| 36. diffuser cylinder | 37. cylinder outlets | 38. activity plate |
| 39. upper plate well | 40. lower plate well | 41. end barrier -sill |
| 42. side barrier -wall | 43. barrier notch | 44. pole notch |
| 45. adjuster | | |

DETAILED DESCRIPTION OF THE PREFERRED EMBODIMENTS OF THE PRESENT INVENTION

A preferred embodiment of the overhead projector fluid dynamics simulator of the present invention is illustrated in FIGS. 1–6. The invention preferably but not necessarily comprises body 15 (FIG. 1) which is formed to create a raised activity area 24 as well as a perimeter fluid transport or distribution system. The fluid distribution system comprises fluid reservoirs 17, 29, 32, 33, which substantially surround activity area 24; conduit 16, which provides fluid communication between the fluid reservoirs via conduit controls 35; and barriers 41, 42. Other parts of body 15 include: pads or legs 27 with connecting adjusters 45, wells 30, and indentions in reservoir floor(s). Body 15 is preferably but not necessarily made of durable material resistant to water, impact, and scratches and it may be transparent in part or whole.

Body 15 may preferably be formed as a unitary member by thermoform or injection mold processes. The component parts of body 15 are die cut, machined and/or routered, or formed by above indicated body processes. Body 15 preferably has rounded and slightly beveled features for personal safety.

Overall size of body 15 is roughly the size of the overhead projector, having a base approximately 14" by 15", a height approximately 1–2" and a thickness of approximately ⅛–¼".

The activity area 24 is preferably elevated relative to the fluid reservoirs 17, 29, 32 and 33. This elevated feature allows fluid ranoff from a higher to a lower area (fluid reservoirs 17, 29, 32 and 33). An elevated activity area 24 is not needed if fluid ranoff is into an area lower than the projector deck or if fluids are vacuumed from activity area 24. The height 23 of activity area 24, with a layer of water added thereon, is preferably sized so that activity area 24 is within projector focal limits. For conventional overhead projectors, activity area 24 is preferably approximately one inch above the overhead projector deck window.

Activity area 24 is preferably made of transparent material which is resistant to water, impact and scratches and is capable of allowing the overhead projector light to pass through relatively unaffectedly.

As shown in FIG. 1, the outer walls defining fluid reservoirs 17, 29, 32 and 33 contact activity area 24 at each corner portion thereof, forming grooved areas or catches 22, to hold individual barriers 42. These grooves 22 may also run along the perimeter floor to accommodate barriers.

The preferred embodiments of the present invention preferably include a means for distributing fluid between fluid reservoirs 17, 29, 32 and 33. The fluid distributing means of the present invention preferably uses a small submersible or non-submersible pump 2 (e.g. aquarium and cooler pumps that can function in about ½ inch or more water depth). Pump 2 is preferably placed in reservoir 17 where the pump outlet is attached to a conduit inlet fitting 20 using flexible tubing. The hose outlet fitting 19 also accommodates similar tubing. This outlet is designed to use "Y" or "T" connectors and a flow control device.

The fluid distributing means preferably includes conduit 16 which provides fluid communication between reservoir 17 and fluid reservoirs 29, 32 and 33. Conduit 16 preferably communicates with each fluid reservoir 29, 32, 33 via a conduit gate 35 associated with each fluid reservoir. As shown in FIGS. 1, 2 and 4, each rectangular gate door 31 of conduit gates 35 slidingly engages via finger manipulation within slot 21 of conduit gate 35 so as to form a substantially water-tight engagement therewith. As a result, the extent into which gate door 31 is inserted within conduit gate 35 in part controls fluid velocity and volume into fluid reservoirs 29, 32, and 33.

Body 15 preferably includes a means for selectively providing fluid communication between fluid reservoir 17 and each of fluid reservoirs 29 and 33 adjacent thereto. In a preferred embodiment, the fluid providing means includes reservoir wall gates 18 and wall gate doors 25, which are similar in structure to conduit gates 35 and conduit gate doors 31. As shown in FIG. 1, selectively removing wall gate doors 25 from wall slots 21 of wall gates 18 provides fluid communication between the associated fluid reservoirs. Conduit gates could be substituted for conduit valves.

The preferred embodiment of the present invention includes a means for controlling the fluid pattern flowing from conduit gates 35. The fluid pattern controlling means includes cylinder diffuser attachment 36 having a plurality of bottom outlet slots 37 which provide for a substantially steady, turbulence-free flow of fluid from conduit gate 35 (FIG. 2). A preferred embodiment may include an additional diffuser option which is fan shaped having a narrow outlet slit running along outside edge. All conduit outlets are compatible with cylinder, fan, and hose placement.

Further, the fluid pattern controlling means preferably includes a means for providing a barrier to fluid which flows over activity area 24. The barrier means preferably includes elongated, rectangular, flat edged barriers 42 which are designed to form a water tight seal with activity area 24 when placed thereover. Barriers 42 preferably slidably fit into shallow grooves 22 on each stage corner wall of activity area 24 (FIG. 1). A water tight seal may be made by surface tension and weight alone or may be assisted by using rubber-like material for barriers 42. Barrier height, resting on activity area 24, is preferably less than the height of the outside walls of body 15 to prevent fluid flow over body rim 28 thereof.

Side barriers 42 are designed to be used in pairs and placed in parallel to each other on opposites sides of activity area 24. They can be moved along activity area 24 to change fluid flow direction. In systems which utilize a single, nonlinear barrier 42, such as a barrier having a ring or U-shape, barrier 42 may be secured to activity area 24 by being inserted into a shallow groove along the floor perimeter thereof. Each barrier 42 preferably but not necessarily includes a notch 43 (FIG. 1) disposed along a longitudinal edge thereof, so that barriers 42 may be placed on activity area 24 with notch 43 extending downwardly in order to redirect flow. In addition, the preferred embodiments of the present invention include at least one end barrier 41 (thickness varies from about 1/16 to ¼) which is placed on inlet or outlet areas of activity area 24 (FIG. 1). Barrier 41 lays flat to create a sill and change fluid depth on activity area 24 by impeding fluid flow.

In an alternative embodiment, some minor changes to body 15 can reduce its size further. If a unidirectional flow simulator is desired only two reservoirs and a single fixed or flexible conduit control system are needed to channel fluid flow on activity area 24. Body 15 could be rotated on the projector deck to change fluid flow direction, instead of using the current fluid conduit gate or valve control system as in the multidirectional flow system of the preferred embodiments. Additional corner pole notches may be incorporated to accommodate a compatible projector deck fit. This alternative embodiment is more suitable for lab table activities and may or may not have a transparent activity area.

The preferred embodiments of the present invention preferably include one or more activity components which are mediums in liquid or solid form and are used to attain desired contrast on activity area 24. Liquid components are placed in wells 30 and solid components are placed in indentations in fluid reservoir flooring. Solid components 38 are preferably transparent, color-coded and made of a durable material resistant to water, impact, and scratches. Solid components 38 preferably have shapes and/or features that allow water to flow internally and/or externally thereto. The solid components 38 typically take the form of plates with configurations that employ wells or channels therein. They may have two or more interconnected levels 39, 40 to direct water and dye flow, as shown in FIG. 3. Other solid components may preferably include relief structures comprising wells, channels, and/or cavities. For example, plate well 39 (FIG. 3) is higher than well 40. This allows fluids to move from one area to another area converting deposited fluids into a variety of horizontal and vertical viewing motions. These fluids may eventually mix with surrounding flow to supplement an event. Linear, circulating, and mixing type motions are also possible with these components. Solid components 38 may be stored in a fixed or moveable storage rack in reservoir(s) 29, 32, 33 when the invention is not in use.

OPERATION OF INVENTION

The present invention may be used to demonstrate a wide variety of non-naturally occurring phenomenon relating to fluid dynamics. The demonstration comprises the steps of first placing body 15 over the overhead projector so that pole notch 44 is aligned with the projector pole. Next, conduit gates 35, wall gates 18 and barriers 42 are manually set so as to introduce fluid into one or more fluid reservoirs so that it eventually flows over activity area 24 and into another fluid reservoir. For example, to create fluid flow across activity area 24 from fluid reservoir 32 to fluid reservoir 17, conduit gate doors 31 are inserted within conduit gates 35 corresponding to reservoirs 29 and 33 so that fluid flow thereto from conduit 16 is interrupted, while conduit gate door 31 is either partially or wholly removed from conduit gate 35 of fluid reservoir 32 so that fluid flows therethrough from conduit 16; and barriers 42 are slid into position in front of fluid reservoirs 29 and 33 so as to block fluid flow therein. Together with controlling the pumping action of pump 2, conduit gate 35 of reservoir 32 determines fluid flow velocity and volume over activity area 24.

Similarly, to create a fluid flow across activity area 24 from fluid reservoir 29 to fluid reservoir 33, conduit gate doors 31 are inserted within conduit gates 35 corresponding to reservoirs 32 and 33, while conduit gate 35 of fluid reservoir 29 remains either wholly or partially opened; barriers 42 are slid into position in front of fluid reservoirs 32 and 17; and fluid reservoir wall gates 18 of fluid reservoir 33 is opened so that water which is pumped from fluid reservoir 17 to fluid reservoir 29 is returned to fluid reservoir 17 after flowing over activity area 24 and into fluid reservoir 33. Reservoir wall gate 18 of fluid reservoir 29 remains closed.

Next, if a substantially turbulent-free fluid flow across activity area 24 is desired, diffuser attachment 37 is attached to the conduit gate(s) 35 from which fluid flows.

It is noted that a variable or multi-directional fluid flow pattern may be created along activity area 24 by wholly or partially opening more than one conduit gate 35 so that fluid flows across activity area 24 from a plurality of fluid reservoirs.

Next, the desired activity components 38 are placed into position. One or more plates 38 are selectively placed on activity area 24, and one or more transparencies are selectively slid between body 15 and the overhead projector so as to be aligned with activity area 24.

Thereafter, appropriate fluid reservoirs are filled with water, and then pump 2 is activated. Liquid activity components, such as liquid dyes or food coloring, are optionally added to the fluid flow or into wells 39, 40 of plates 38 by use of an eye dropper. Moreover, a hose may be connected to hose outlet 19, optionally placed in holder 26 of body 15, and aimed at activity area 24 in order to create an additional source of fluid flow.

Note: standard attachments (pump, fittings, tubing, etc.) are semi-permanently installed and need not be removed each time.

Accordingly, while the fluid dynamics demonstration apparatus of the present invention is designed to be used on an overhead projector it can also be used without light projection. The activities that this device can perform are not limited to the condensed activity component events described here. Also, modifications of this basic principle should not limit scope of this invention. Design adjustments for newer projection units could incorporate this invention.

This briefcase size simulator will encourage teachers to use it in both small and large audiences. This unit is easy to: handle, clean, transport, store, operate, demonstrate, experiment, and afford (also has few expendables).

The scope of this invention should be determined by the appended claims rather than by the description given hereinabove.

I claim:

1. An educational device for use with overhead projectors, comprising:

a base member having a plurality of fluid reservoirs which are disposed along the periphery thereof;

an activity area which is disposed in a central portion of said base member, over which fluid flows;

means for selectively distributing fluid between said fluid reservoirs;

means for selectively controlling a flow of fluid over said activity area from one of said fluid reservoirs to another of said fluid reservoirs;

said activity area is elevated relative to flooring of said reservoirs so that fluid depth over said activity area is substantially constant; and said activity area is substantially transparent.

2. A device as recited in claim 1, wherein:

said distributing means includes a pump member and a conduit selectively connected to said pump member and to each of said fluid reservoirs.

3. A device as recited in claim 2, wherein:

said fluid distributing means comprises a first gate means for selectively providing fluid communication between said conduit and each of said fluid reservoirs; and wherein said first gate means includes a gate valve member and a first door member which is selectively slidably inserted within said gate valve member so as to provide a substantially watertight seal therewith.

4. A device as recited in claim 3, further including:

second gate means for providing fluid communication between adjacent fluid reservoirs.

5. A device as recited in claim 4, wherein:

said second gate means includes an aperture defined through a wall between adjacent fluid reservoirs and a second door member which is slidably engaged with said aperture so as to provide a substantially watertight seal therewith.

6. A device as recited in claim 1, further including:

at least one transparency which is selectively positioned between said activity area and an overhead projector, said transparency visually depicting a fluid dynamics condition.

7. A device as recited in claim 1, further including:

at least one plate member which is sized for selective placement over said activity area and which includes a plurality of interconnected wells through which fluid flows when flowing over said activity area.

8. A device as recited in claim 7, wherein:

said wells of said at least one plate member are at different elevations.

9. A device as recited in claim 2, wherein:

said pump member is disposed within a first of said fluid reservoirs; and said conduit provides fluid communication between said first reservoir and each remaining fluid reservoir.

10. A device as recited in claim 1, further including:

at least one first elongated member which is selectively slidably engaged along an edge of said activity area so as to substantially prevent fluid flow between said activity area and said fluid reservoir adjacent said activity area edge.

11. A device as recited in claim 10, wherein:

said at least one first elongated member includes a slot defined therealong so as to allow an amount of fluid flow therethrough when said elongated member is engaged along an edge of said activity area.

12. A device as recited in claim 10, further including:

at least one second elongated member which is selectively slidably engaged along an edge of said activity area substantially laterally to the fluid flow.

13. A device as recited in claim 3, further including:

means, connected to said gate valve member, for diffusing fluid flowing from said conduit to a fluid reservoir.

14. A fluid dynamics educational kit for use with an overhead projector, comprising:

a base having a plurality of reservoirs defined therein;

an activity area disposed between said reservoirs, over which fluid flows, said activity area being substantially transparent;

means for pumping fluid between said reservoirs;

a plurality of plate members which are selectively disposed over said activity area for allowing fluid to flow thereover; and a plurality of transparencies, wherein each of said transparencies depicts a different image and is selectively disposed between an overhead projector and said activity area.

15. A kit as recited in claim 14, wherein:

said activity area is elevated relative to said reservoirs so that a substantially uniform level of fluid selectively flows thereover.

16. A kit as recited in claim 14, wherein:

a number of said plate members include means for concurrently providing horizontal and vertical fluid flow thereover.

17. A kit as recited in claim 16, wherein:

said concurrent fluid flow providing means comprises a plurality of wells defined within said plate member, with said wells being at different elevations relative to each other.

18. A kit as recited in claim 14, further including:

a plurality of elongated members which selectively engage with said activity area so as to direct fluid flow thereover between said reservoirs.

19. A kit as recited in claim 14, wherein:

said pumping means includes a pump, tubing connected to said pump and to each of said reservoirs, and valve members connected between said tubing and each of said reservoirs.

20. An educational apparatus, comprising:

a base having a plurality of reservoirs defined therein;

an activity area disposed between said reservoirs, over which fluid flows, said activity area being substantially transparent;

means for pumping fluid between said reservoirs;

a plurality of plate members which are selectively disposed over said activity area for allowing fluid to flow thereover; and a plurality of transparencies, wherein each of said transparencies depicts a different image and is selectively disposed between an overhead projector and said activity area.

21. A device as recited in claim 1, wherein:

said base member, said activity area, said distributing means and said controlling means are substantially portable and are sized to rest on top of an overhead projector.

* * * * *